No. 790,140. PATENTED MAY 16, 1905.
J. KREPP.
NUT MACHINE.
APPLICATION FILED APR. 11, 1904.

2 SHEETS—SHEET 1.

Witnesses:
C. Klostermann
E. E. Potter

Inventor
J. Krepp
by N. C. Everitt Co.
Attorneys.

No. 790,140. PATENTED MAY 16, 1905.
J. KREPP.
NUT MACHINE.
APPLICATION FILED APR. 11, 1904.
2 SHEETS—SHEET 2.
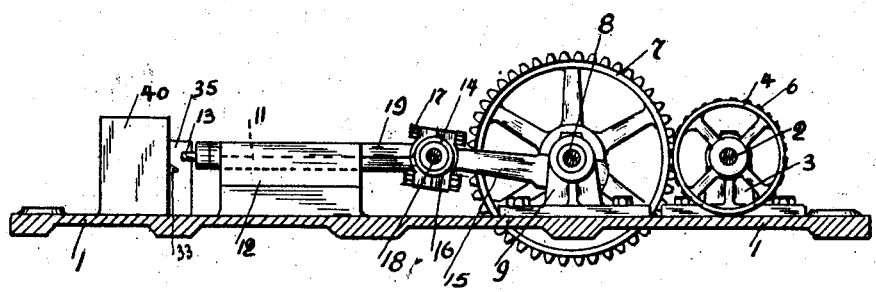

No. 790,140.

Patented May 16, 1905.

UNITED STATES PATENT OFFICE.

JOHN KREPP, OF ALLEGHENY, PENNSYLVANIA.

NUT-MACHINE.

SPECIFICATION forming part of Letters Patent No. 790,140, dated May 16, 1905.

Application filed April 11, 1904. Serial No. 202,638.

*To all whom it may concern:*

Be it known that I, JOHN KREPP, a citizen of the United States of America, residing at Allegheny, in the county of Allegheny and State of Pennsylvania, have invented certain new and useful Improvements in Nut-Machines, of which the following is a specification, reference being had therein to the accompanying drawings.

This invention has relation to nut-making machines, and has for its object the provision of a machine of a novel construction which will cut a blank from a bar, automatically move the same to position in front of a punch, and will punch a cavity in the nut for the reception of a screw-thread and simultaneously form the outer end of the nut to any desired configuration.

Figure 5:
Figure 6:
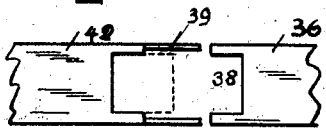
Figure 1:
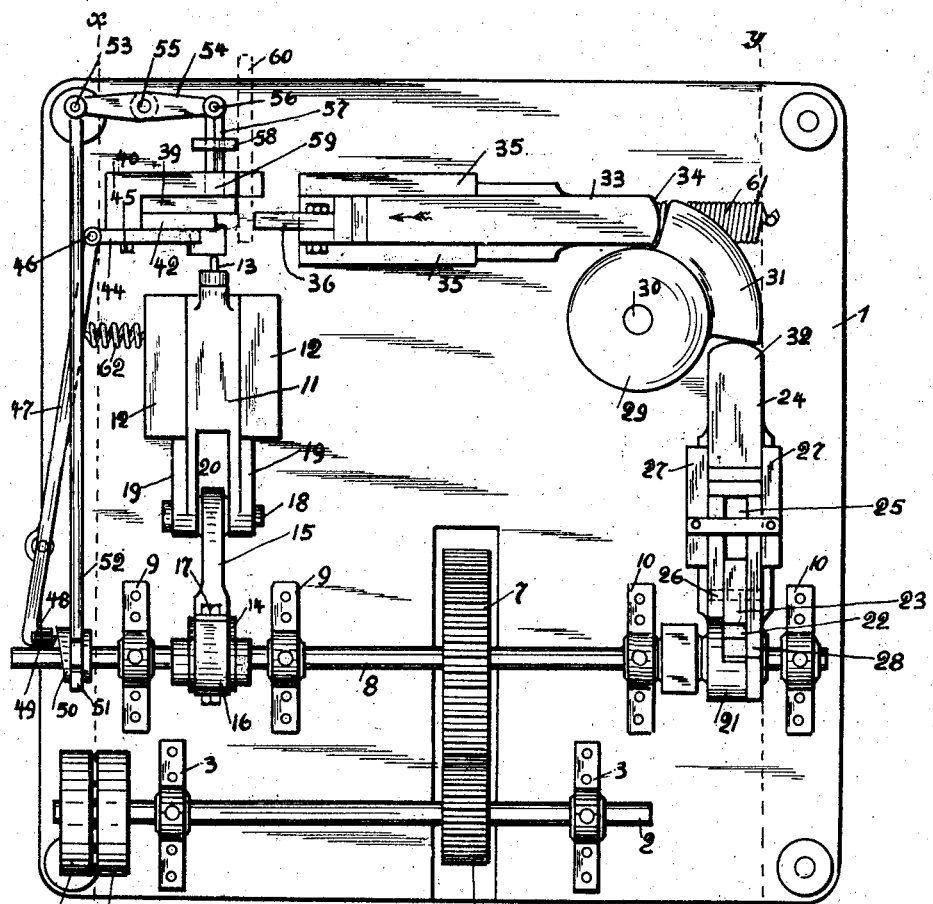
Figure 7:
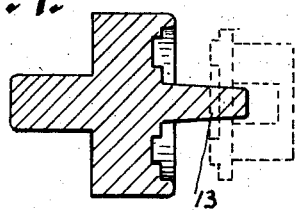

Referring to the accompanying drawings, Figure 1 is a top plan view of the complete machine. Fig. 2 is a sectional view on the line $x$ $x$ of Fig. 1. Fig. 3 is an enlarged top plan view of the cutting-dies. Fig. 4 is a sectional view of the machine shown in Fig. 1 on the line $y$ $y$ of the same. Fig. 5 is a side elevation of the cutting-dies. Fig. 6 is a similar view of a modified form of dies, and Fig. 7 is an enlarged view in section of the punch for forming the cavity in the nut.

The operative parts of the machine are mounted on a base 1 and receive motion through a shaft 2, journaled in bearings 3 3 and provided with a fast pulley 4 and a loose pulley 5. A pinion 6 on the shaft 3 communicates motion through a gear-wheel 7 to a shaft 8, the said shaft 8 being mounted in bearings 9 9 on one side of the gear-wheel 7 and in bearings 10 10 on the other side of the gear-wheel 7.

11 designates a sliding cross-head, which is mounted in ways 12 12 and carries the punch 13. A crank 14 is mounted on the shaft 8 between the bearings 9 9, and a pitman 15, which is mounted on the crank 14 by means of bolts 17, is connected to the cross-head 11 by a bolt 18, the cross-head being formed with rearwardly-extending legs 19, between which the pitman 15 is pivotally secured by the bolt 18, the said legs having a space 20 between them, which in the event of the bolt 18 breaking will permit of the pitman moving freely between the legs without contacting with the body of the cross-head 11. A cam 21 is carried by the shaft 8 between the bearings 10 10, and this cam works against an abutment 22 on the end of a block 23, that is carried by a slide 24, the said slide having a space 25 into which said block fits, the block being retained therein by a bolt 26, the arrangement being such that in the event of the movement of the slide being prevented by an obstruction to the operation of the device the bolt 26 will be broken or sheared off and will permit the block 23 to move in the slide without moving the latter.

The slide 24 is guided between ways 27, and one side of the slide is prolonged, as shown at 28, and bears against the flat face of the cam 21.

A rocking disk 29 is pivotally secured at 30 to the base 1, and said rocking disk carries an arc-shaped piece 31, against which the rounded end 32 of the slide 24 bears. A slide 33, which has a rounded end 34 that bears against the arc-shaped piece 31, is mounted in ways 35 35 on the base 1, and said slide 33 carries a cutting and forming die 36, the cutting end of which is in the form of one-half a diamond, as shown at 37 in Fig. 5, or one-half of a square, as shown at 38 in Fig. 6. A similar die 39 is mounted in stationary position upon the base 1, being sustained and supported by an L-shaped abutment 40, the end of the die 39 being shaped, as shown at 41, to conform to the end of the die 36 and the end of the abutment 40 being shaped to conform to the angle of the lower corner of the die 39. A third die 42 is arranged alongside of the die 39, its end 43 being of the same configuration as the ends of the die 36 and 42, but the die-cavity therein being somewhat smaller than the die-cavity in the dies 36 and 42. A sliding plate 44 is mounted on the end of the abutment 40, being supported by a bolt 45, that fits in a slotted way in the plate, and the said plate is pivotally connected at 46 to a rocking arm 47, which has an inwardly-bent bifurcated end 48, between the legs of which is mounted a friction-wheel 49, that bears against the cam 50, mounted on the shaft 8.

The cam 50 is formed with an eccentric-groove that is embraced by an eccentric-strap 51, and said strap is connected to an eccentric-rod 52, that is pivoted at 53 to a rocking arm 54, which is in turn pivoted at 55 on the base 1. The rocking arm 54 is pivotally attached at 56 to a square punch 57, which slides in a bracket 58 and works in a square hole 59 in the abutment 40.

The punch 57 has on its end a design in intaglio or relief of any desired character, the function of this punch being to produce an ornamental configuration on the end of the nut, while the punch 13 is designed to produce the cavity in the nut, which is subsequently screw-threaded for the reception of the end of a bolt, axle, or other part upon which it may be placed.

The operation of the above-described machine is as follows: Motion being communicated to the shaft 2 from any suitable source through the pulley 4 is communicated, through pinion 6 and gear-wheel 7, to the shaft 8. A bar of metal, as shown at 60 in dotted line of Fig. 1, is interposed between the ends of the dies 36 and 39, and motion being imparted to the slide 33 through the movement of the slide 24 by the rotation of the cam 21 a blank will be cut off from the rod and after having been cut off will be sustained between the end of the die 36 and the end of the plate 44, the latter being at this time in such position as to constitute, in connection with the die 36, a clamp for the conveyance of the blank to a position to be operated upon by the die 39 and punches 13 and 59. After the blank has been severed the die 36 and plate 44, moving at the same rate of speed in the direction of the arrow shown on the die, will convey the blank to a position against the die 42, it being understood that the force exerted in cutting the blank wedges it tightly into the die 36 and that it is sustained between the plate 44 and the die 36 and at the same time bears against the face of the die 39, and the blank will be compressed between the dies 36 and 42 and reduced to the proper size. While the blank is held between the dies 36 and 42, the slide 11 being in motion will bring the punch 13 forward and force it into the nut, the base of the punch 13 being formed with an annular groove and the said base serving to upset a flange with an annular bead upon the nut simultaneously with the formation of the cavity therein. At the same time that the cavity is being formed in the nut the punch 57 is projected against the outer end of the nut by the movement imparted to rocking arm 54 through eccentric-rod 52, and the outer end of the nut is impressed with the ornamental configuration of the end of the said punch 57. The return movement of the slide 33 is effected by means of a spring 61, and the return movement of the plate 44 is effected by means of a spring 62, which is attached to the rocking arm 47. If at any time during the operation of the machine the resistance of the metal, either to the shearing off or punching operation, should be so great as to endanger the mechanism, the bolt 10 or the bolt 26, as the case may be, will be sheared off, these bolts being of such size as that they will constitute the weakest parts of the mechanism, and the shearing off of these bolts will obviate more serious injury to the moving parts, the parts connected by these bolts being, as before stated, so constructed that when the bolts are sheared off the parts can move relatively to one another without damage.

Having described my invention, I claim—

1. In a machine of the character described, the combination of a base, a shaft mounted thereon, a cam carried by said shaft, a slide mounted on said base and contacting with said cam, a rocking disk movable by said slide, a second slide contacting with said rocking disk and movable thereby, a die carried on said last-named slide, and cutting and punching mechanism coacting with said die and operable by said shaft.

2. In a machine of the character described, the combination with a stationary die, a movable shearing-die acting in conjunction with said stationary die to shear a blank from a bar, a punch for forming a cavity in the blank, means for transferring the blank from the position in which it is cut from the bar to a position in which it can be operated on by said punch, and means for holding the blank while being punched, of a supplementary punch for shaping the end of the blank, arranged to operate on the opposite end of the blank to said first-named punch and means for imparting motion in opposite directions simultaneously to both said punches.

3. In a machine of the character described, the combination with a shaft, means for imparting motion thereto, a cam mounted on said shaft, a slide contacting with said cam, a rocking disk contacting with said slide, a second slide contacting with said disk, a stationary cutting-die and a die carried by said last-named slide, of a cross-head, a punch carried by said cross-head, a crank on said shaft, a pitman connected to the said crank and to the said cross-head, a cam mounted on said shaft and having an eccentric-groove, an eccentric-strap surrounding said groove and a rod connected to said strap, a rocking arm connected to said rod, a punch connected to said rocking arm and arranged in alinement with the punch on the cross-head, a rocking arm contacting at one end with said cam and pivotally connected at its opposite end to a sliding plate adapted to slide in a plane parallel to the side of the moving die, said parts being so arranged that the said plate and die will be simultaneously moved in the same direction by the rotation of the said shaft and will remain in stationary position during the movement of the punch carried by the cross-head.

4. In a punching-machine, the combination of forming-dies, means for moving one of said forming-dies, a punch arranged in a direction at right angles to the direction of movement of said forming-dies, means for moving said punch, a supplementary punch arranged in alinement with said first-named punch and adapted to operate in opposition thereto and means for moving said last-named punch.

In testimony whereof I affix my signature in the presence of two witnesses.

JOHN KREPP.

Witnesses:
H. C. EVERT,
E. E. POTTER.